(12) United States Patent
Park et al.

(10) Patent No.: US 9,999,065 B2
(45) Date of Patent: Jun. 12, 2018

(54) METHOD AND APPARATUS FOR ENFORCING PRIORITIZED BIT RATE IN WIRELESS COMMUNICATION SYSTEM

(71) Applicant: LG Electronics Inc., Seoul (KR)

(72) Inventors: Sungjun Park, Seoul (KR); Sunghoon Jung, Seoul (KR); Seungjune Yi, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 25 days.

(21) Appl. No.: 14/904,755

(22) PCT Filed: Jul. 22, 2014

(86) PCT No.: PCT/KR2014/006624
§ 371 (c)(1),
(2) Date: Jan. 13, 2016

(87) PCT Pub. No.: WO2015/012557
PCT Pub. Date: Jan. 29, 2015

(65) Prior Publication Data
US 2016/0174243 A1    Jun. 16, 2016

Related U.S. Application Data

(60) Provisional application No. 61/857,249, filed on Jul. 23, 2013.

(51) Int. Cl.
*H04W 72/12* (2009.01)
*H04W 72/04* (2009.01)
*H04W 72/14* (2009.01)

(52) U.S. Cl.
CPC ... *H04W 72/1242* (2013.01); *H04W 72/0413* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 2008/0318578 A1* | 12/2008 | Worrall | H04W 36/02 455/437 |
| 2009/0323601 A1 | 12/2009 | Wu | |
| 2010/0046456 A1 | 2/2010 | Yi et al. | |
| 2010/0120459 A1 | 5/2010 | Delaval | |
| 2010/0281486 A1 | 11/2010 | Lu et al. | |
| 2011/0038333 A1* | 2/2011 | Yi | H04W 72/10 370/329 |
| 2013/0051334 A1 | 2/2013 | Sammour et al. | |
| 2014/0254476 A1* | 9/2014 | Blankenship | H04L 47/20 370/328 |
| 2015/0016367 A1* | 1/2015 | Koskinen | H04L 5/001 370/329 |

* cited by examiner

*Primary Examiner* — James P Duffy
(74) *Attorney, Agent, or Firm* — Dentons US LLP

(57) ABSTRACT

A method and apparatus for enforcing a prioritized bit rate (PBR) in a wireless communication system is provided. A user equipment (UE) receiving a PBR and a division reference, for a radio bearer in which uplink (UL) data is transmitted through a plurality of media access control (MAC) entities, and divides the PBR to at least one MAC entity among the plurality of MAC entities according to the division reference. And, the UE generates at least one MAC protocol data unit (PDU) by applying the divided PBR to the at least one MAC entity.

10 Claims, 22 Drawing Sheets

(a)

(b)

METHOD AND APPARATUS FOR ENFORCING PRIORITIZED BIT RATE IN WIRELESS COMMUNICATION SYSTEM

This application is a 35 USC § 371 National Stage entry of International Application No. PCT/KR2014/006624 filed on Jul. 22, 2014, and claims priority to U.S. Provisional Application No. 61/857,249 filed on Jul. 23, 2013, all of which are hereby incorporated by reference in their entireties as if fully set forth herein.

BACKGROUND OF THE INVENTION

Field of the Invention

The present invention relates to wireless communications, and more specifically, to a method and apparatus for enforcing a prioritized bit rate (PBR) in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for the 3GPP LTE will focus on additional functionalities for enhanced performance in hotspot areas for indoor and outdoor using low power nodes.

In LTE Rel-12, a new study on small cell enhancement has started, where dual connectivity is supported. Dual connectivity is an operation where a given UE consumes radio resources provided by at least two different network points (master eNB (MeNB) and secondary eNB (SeNB)) connected with non-ideal backhaul while in RRC_CONNECTED. Furthermore, each eNB involved in dual connectivity for a UE may assume different roles. Those roles do not necessarily depend on the eNB's power class and can vary among UEs.

When a logical channel is configured, the corresponding radio link control (RLC) entity is established. The corresponding RLC layer and a media access control (MAC) layer are connected with the logical channel. When the logical channel is configured, a prioritized bit rate (PBR) is configured for the logical channel. The PBR is used in a logical channel prioritization (LCP) procedure.

A method for enforcing the PBR for dual connectivity effectively may be required.

SUMMARY OF THE INVENTION

The present invention provides a method and apparatus for enforcing a prioritized bit rate (PBR) in a wireless communication system. The present invention provides a method for enforcing a PBR for dual connectivity. The present invention provides a method for allocating a PBR for a radio bearer (RB), corresponding to a radio link control (RLC) entity, to a media access control (MAC) entity, when a plurality of MAC entities are connected to one RLC entity.

In an aspect, a method for enforcing, by a user equipment (UE), a prioritized bit rate (PBR) in a wireless communication system is provided. The method includes receiving a PBR and a division reference, for a radio bearer in which uplink (UL) data is transmitted through a plurality of media access control (MAC) entities, dividing the PBR to at least one MAC entity among the plurality of MAC entities according to the division reference, and generating at least one MAC protocol data unit (PDU) by applying the divided PBR to the at least one MAC entity.

The division reference may include a MAC entity identifier indicating the at least one MAC entity, to which the divided PBR is applied, among the plurality of MAC entities. The division reference may include a ratio of PBRs applied to each of the plurality of MAC entities. The division reference may include at least one of a cell identifier or a group identifier. The division reference may correspond to a number of UL grants. The division reference may correspond to an amount of a UL grant.

The plurality of MAC entities may include a MAC entity for a master eNodeB (MeNB) in dual connectivity and a MAC entity for a secondary eNB (SeNB) in dual connectivity. The MeNB may be an eNB in which a signaling radio bearer (SRB) is defined, and the SeNB may be an eNB in which the SRB is not defined.

In another aspect, a user equipment (UE) in a wireless communication system is provided. The UE includes a radio frequency (RF) unit for transmitting or receiving a radio signal, and a processor coupled to the RF unit, and configured to receive a prioritized bit rate (PBR) and a division reference, for a radio bearer in which uplink (UL) data is transmitted through a plurality of media access control (MAC) entities, divide the PBR to at least one MAC entity among the plurality of MAC entities according to the division reference, and generate at least one MAC protocol data unit (PDU) by applying the divided PBR to the at least one MAC entity.

When a plurality of MAC entities are connected to one RLC entity, a problem that a PBR for a radio bearer, corresponding to the RLC entity, is enforced beyond a configured value can be avoided.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
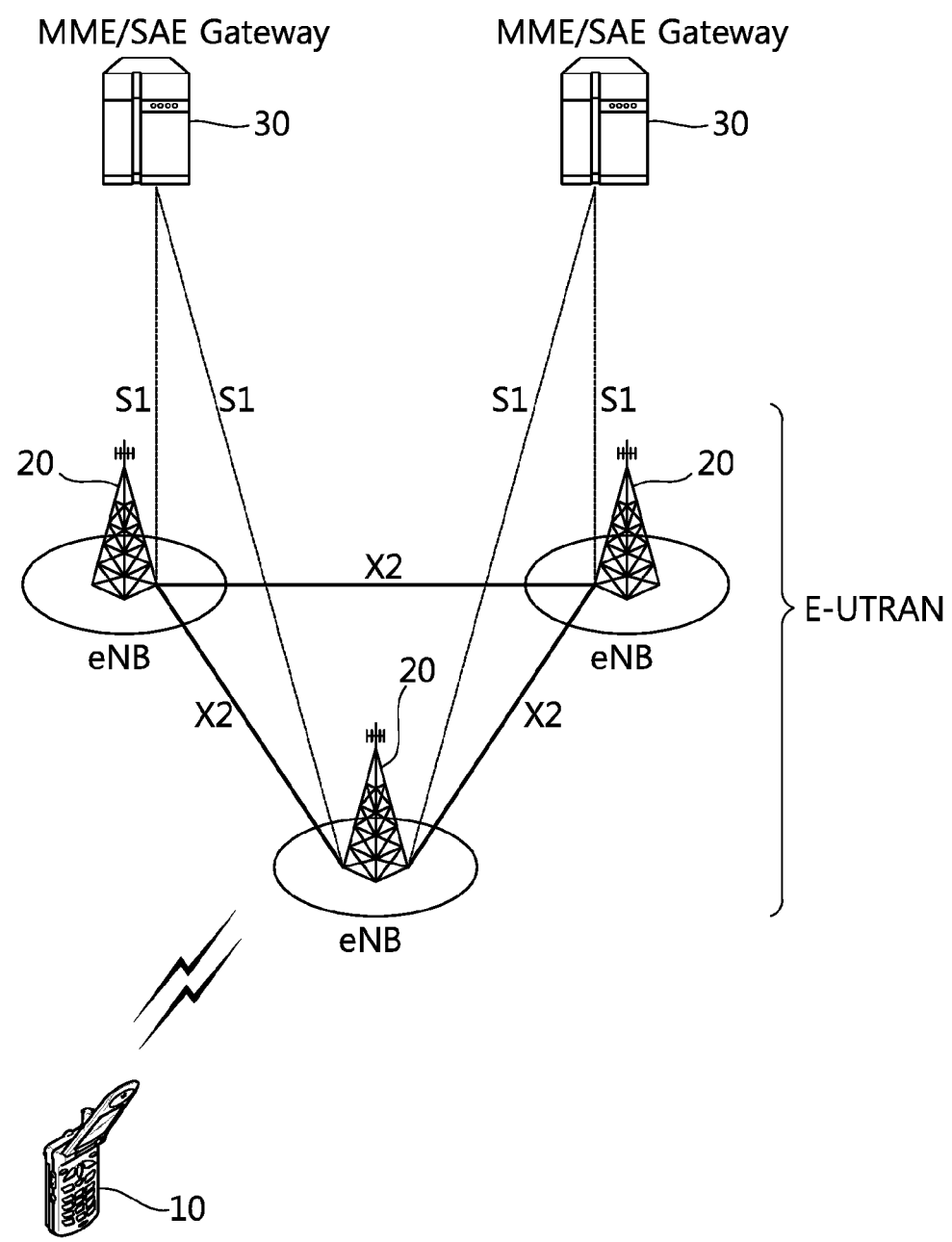
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Figure 2:
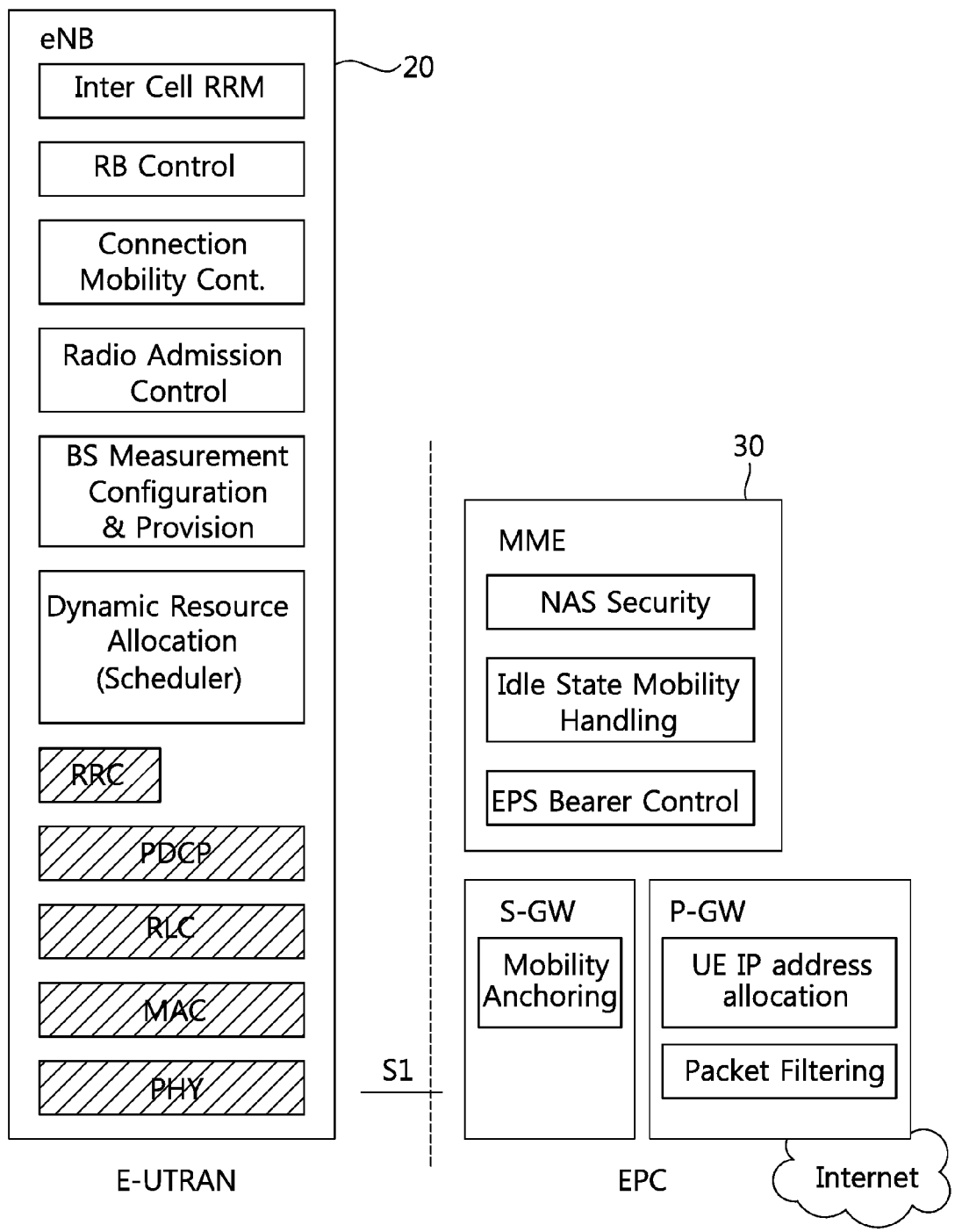
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
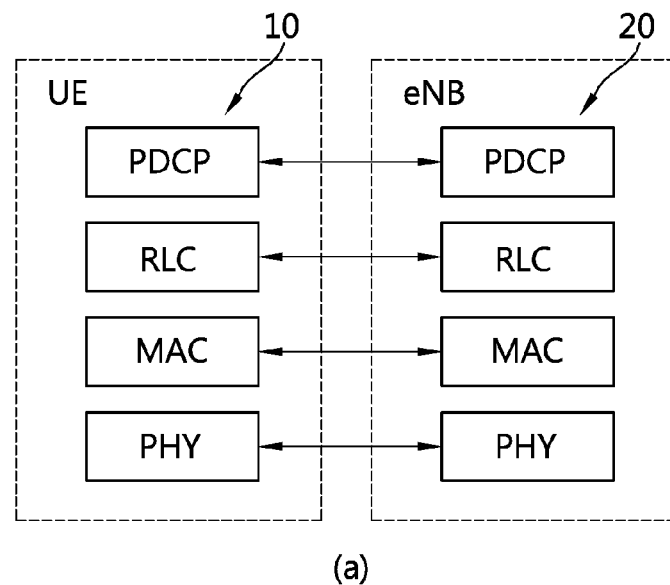
FIG. 3 shows a block diagram of a user plane protocol stack and a control plane protocol stack of an LTE system.
Figure 3:
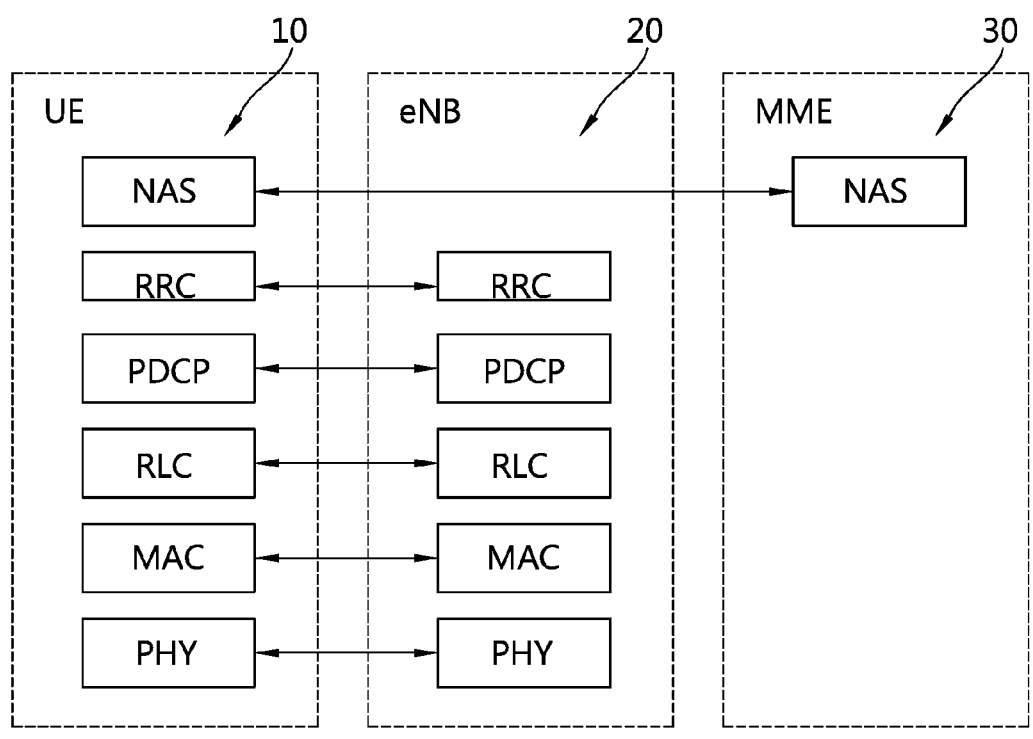

FIG. 3 shows a block diagram of a user plane protocol stack and a control plane protocol stack of an LTE system. FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
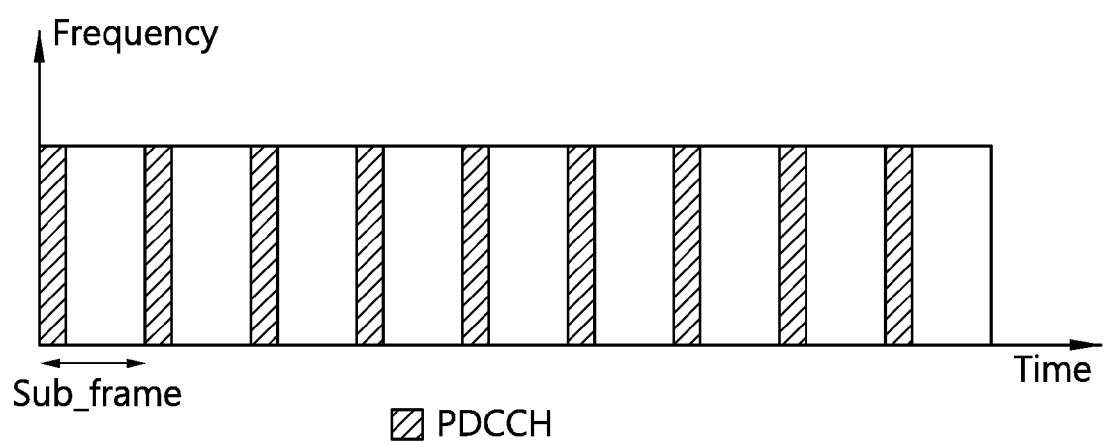
FIG. 4 shows an example of a physical channel structure.

FIG. 4 shows an example of a physical channel structure. A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

$$\text{Transmit power} = \text{TransmitPilot} - \text{RxPilot} + \text{ULInterference} + \text{Offset} + \text{SNRRequired}$$

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

Carrier aggregation (CA) is described. It may be referred to Section 5.5 of 3GPP TS 36.300 V11.6.0 (2013-06).

In CA, two or more component carriers (CCs) are aggregated in order to support wider transmission bandwidths up to 100 MHz. A UE may simultaneously receive or transmit on one or multiple CCs depending on its capabilities. A UE with single timing advance capability for CA can simultaneously receive and/or transmit on multiple CCs corresponding to multiple serving cells sharing the same timing advance (multiple serving cells grouped in one timing advance group (TAG)). A UE with multiple timing advance capability for CA can simultaneously receive and/or transmit on multiple CCs corresponding to multiple serving cells with different timing advances (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG).

A serving cell is combination of downlink and optionally uplink resources. That is, a serving cell may consist of one DL CC and one UL CC. Alternatively, a serving cell may consist of one DL CC. CA may have a plurality of serving cells. The plurality of serving cells may consist of one primary serving cell (PCell) and at least one secondary serving cell (SCell). PUCCH transmission, random access procedure, etc., may be performed only in the PCell.

Figure 5:
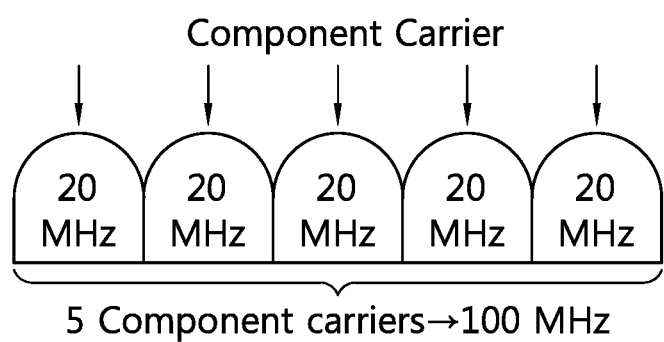
FIG. 5 shows an example of a carrier aggregation of 3GPP LTE-A.

FIG. 5 shows an example of a carrier aggregation of 3GPP LTE-A. Referring to FIG. 5, each CC has a bandwidth of 20 MHz, which is a bandwidth of 3GPP LTE. Up to 5 CCs may be aggregated, so maximum bandwidth of 100 MHz may be configured.

CA is supported for both contiguous and non-contiguous CCs with each CC limited to a maximum of 110 RBs in the frequency domain using the Rel-8/9 numerology.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical TDD deployments, the number of CCs and the bandwidth of each CC in UL and DL is the same. The number of TAGs that can be configured depends on the TAG capability of the UE.

CCs originating from the same eNB need not to provide the same coverage.

CCs shall be LTE Rel-8/9 compatible. Nevertheless, existing mechanisms (e.g., barring) may be used to avoid Rel-8/9 UEs to camp on a CC.

The spacing between center frequencies of contiguously aggregated CCs shall be a multiple of 300 kHz. This is in order to be compatible with the 100 kHz frequency raster of Rel-8/9 and at the same time preserve orthogonality of the subcarriers with 15 kHz spacing. Depending on the aggregation scenario, the n×300 kHz spacing can be facilitated by insertion of a low number of unused subcarriers between contiguous CCs.

For TDD CA, the downlink/uplink configuration is identical across component carriers in the same band and may be the same or different across component carriers in different bands.

Figure 6:
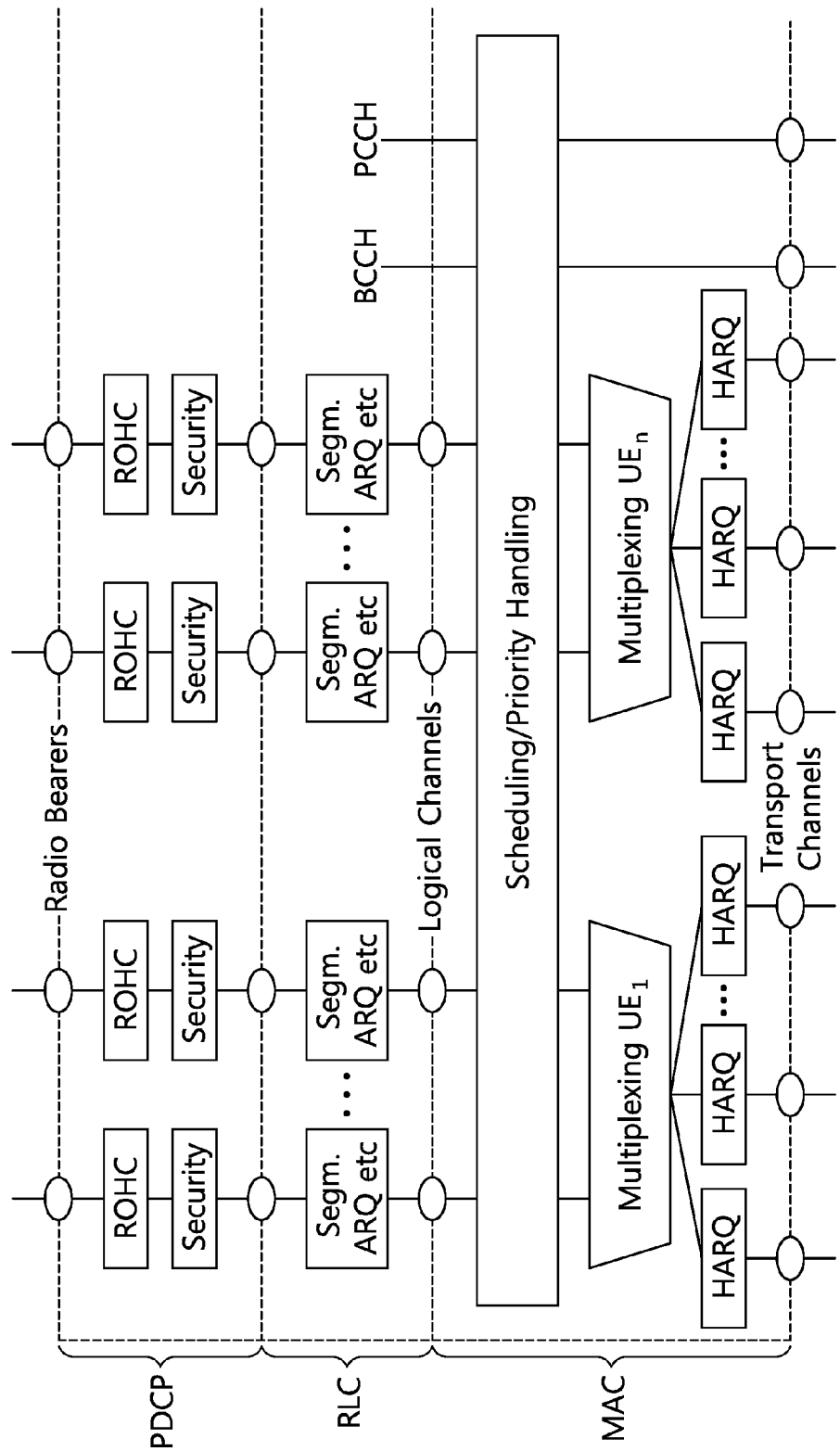
FIG. 6 shows an example of a layer 2 DL structure for CA.
Figure 7:
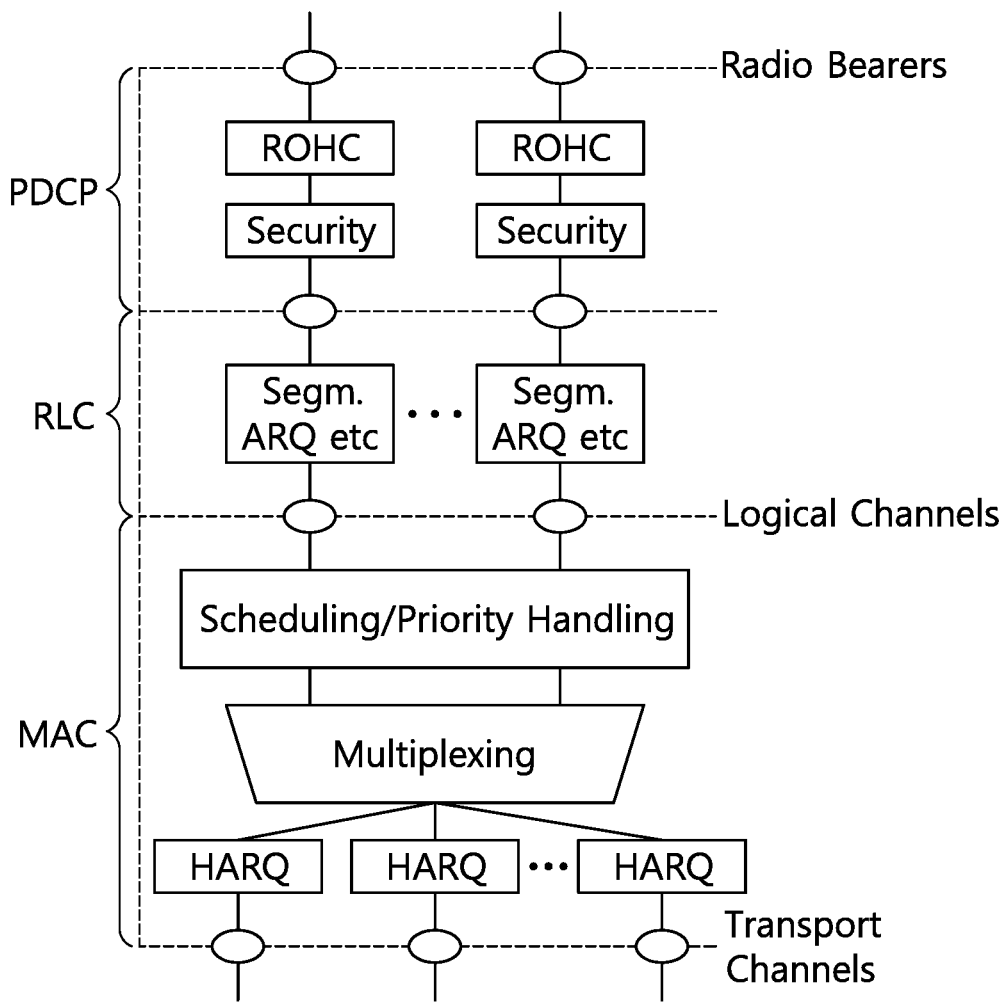
FIG. 7 shows an example of a layer 2 UL structure for CA.

FIG. 6 shows an example of a layer 2 DL structure for CA. FIG. 7 shows an example of a layer 2 UL structure for CA. CA may affect a MAC sublayer of the layer 2. For example, since CA uses a plurality of CCs, and each HARQ entity manages each CC, the MAC sublayer shall perform operations related to a plurality of HARQ entities. Further, each HARQ entity processes a transport block independently. Therefore, in CA, a plurality of transport blocks may be transmitted or received at the same time through a plurality of CCs.

Small cell enhancement is described. It may be referred to 3GPP TR 36.932 V12.0.0 (2012-12).

Figure 8:
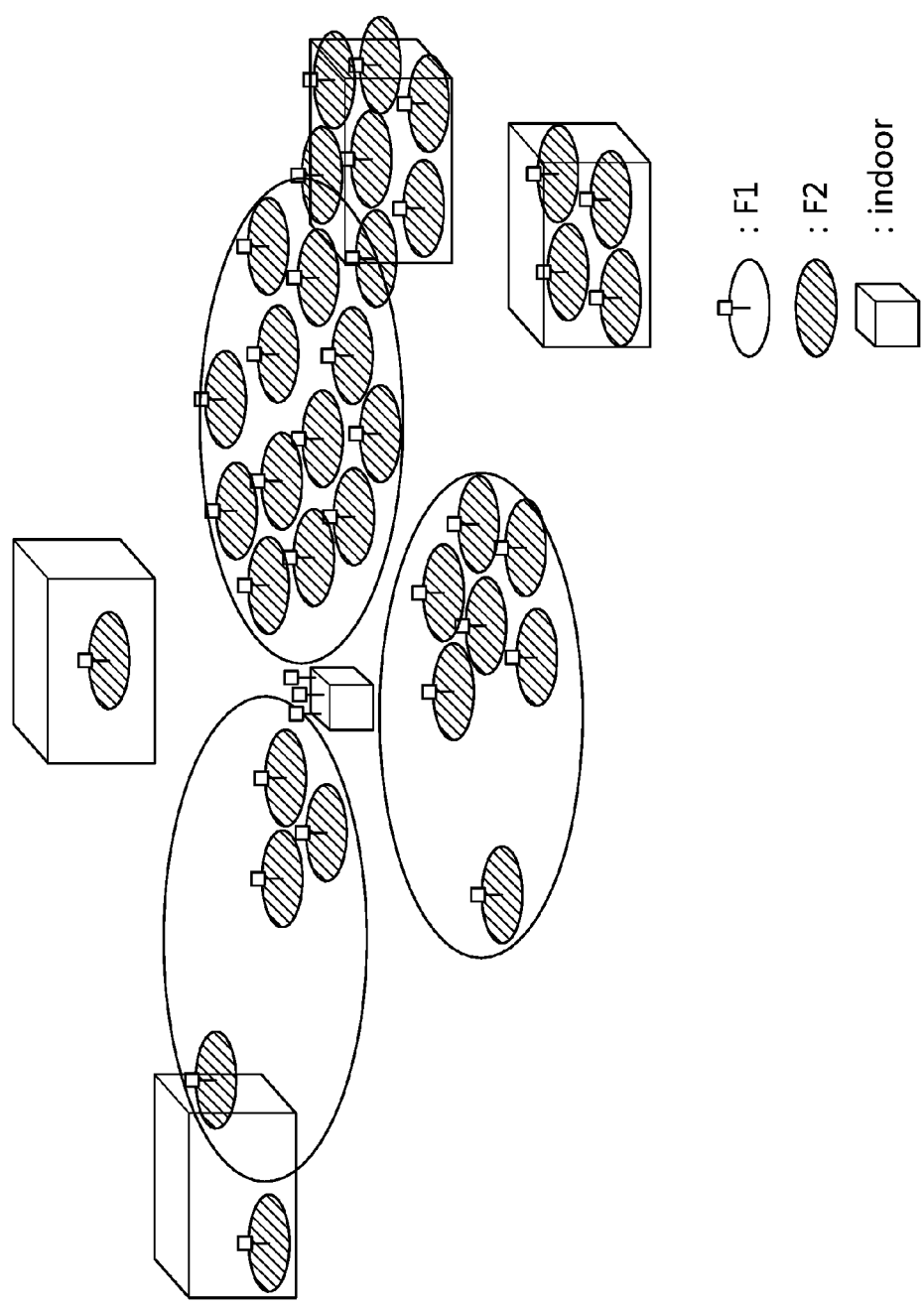
FIG. 8 shows deployment scenarios of small cells with/without macro coverage.

FIG. 8 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 8, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:

where the UE is in coverage of both the macro cell and the small cell simultaneously where the UE is not in coverage of both the macro cell and the small cell simultaneously.

Also, the deployment scenario where small cell nodes are not deployed under the coverage of one or more overlaid E-UTRAN macro-cell layer(s) may be considered.

Small cell enhancement should target both outdoor and indoor small cell deployments. The small cell nodes could be deployed indoors or outdoors, and in either case could provide service to indoor or outdoor UEs.

For indoor UE, only low UE speed (0-3 km/h) is targeted. For outdoor, not only low UE speed, but also medium UE speed (up to 30 km/h and potentially higher speeds) is targeted.

Both throughput and mobility/connectivity shall be used as performance metric for both low and medium mobility. Cell edge performance (e.g. 5%-tile CDF point for user throughput) and power efficiency (of both network and UE) are also used as metrics.

Both ideal backhaul (i.e., very high throughput and very low latency backhaul such as dedicated point-to-point connection using optical fiber, line-of-sight (LOS) microwave) and non-ideal backhaul (i.e., typical backhaul widely used in the market such as xDSL, non-LOS (NLOS) microwave, and other backhauls like relaying) should be studied. The performance-cost trade-off should be taken into account.

For interfaces between macro and small cell, as well as between small cells, the studies should first identify which kind of information is needed or beneficial to be exchanged between nodes in order to get the desired improvements before the actual type of interface is determined. And if direct interface should be assumed between macro and small cell, as well as between small cell and small cell, X2 interface can be used as a starting point.

Small cell enhancement should consider sparse and dense small cell deployments. In some scenarios (e.g., hotspot indoor/outdoor places, etc.), single or a few small cell node(s) are sparsely deployed, e.g., to cover the hotspot(s). Meanwhile, in some scenarios (e.g., dense urban, large shopping mall, etc), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e., a small cell cluster.

Furthermore, smooth future extension/scalability (e.g., from sparse to dense, from small-area dense to large-area dense, or from normal-dense to super-dense) should be considered. For mobility/connectivity performance, both sparse and dense deployments should be considered with equal priority.

Both synchronized and un-synchronized scenarios should be considered between small cells as well as between small cells and macro cell(s). For specific operations, e.g., interference coordination, carrier aggregation and inter-eNB coordinated multi-point (COMP), small cell enhancement can benefit from synchronized deployments with respect to small cell search/measurements and interference/resource management. Therefore time synchronized deployments of small cell clusters are prioritized in the study and new means to achieve such synchronization shall be considered.

Small cell scenarios for evaluation are described.

Figure 9:
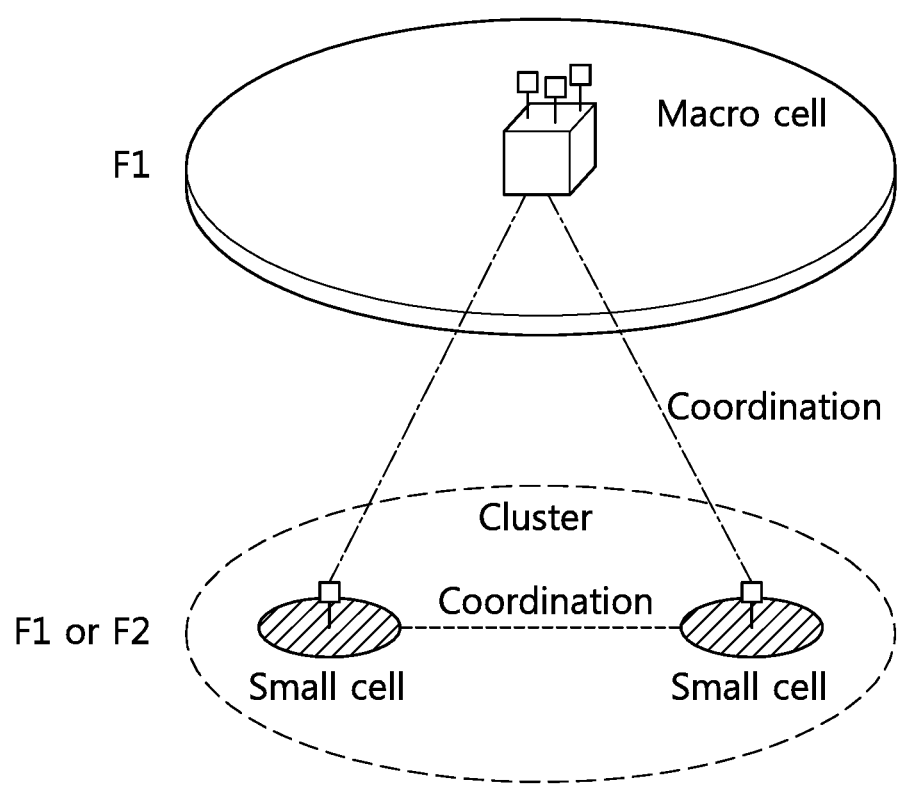
FIG. 9 shows an example of small cell deployment scenario for evaluation.

FIG. 9 shows an example of small cell deployment scenario for evaluation. The small cell deployment scenario described in FIG. 9 is a common design for small cell scenarios for evaluation purpose. It is noted that the addition of scenarios for evaluation of higher-layer aspects may be considered depending on the outcome of the higher-layer studies. Referring to FIG. 9, a macro cell may operate at frequency F1. An overlaid macro cell may be present or not. Small cells, which constitute a small cell cluster, may operate at frequency F1 or F2. The small cells in the small cell cluster may coordinate with each other. The macro cell and the small cells may coordinate with each other.

Figure 10:
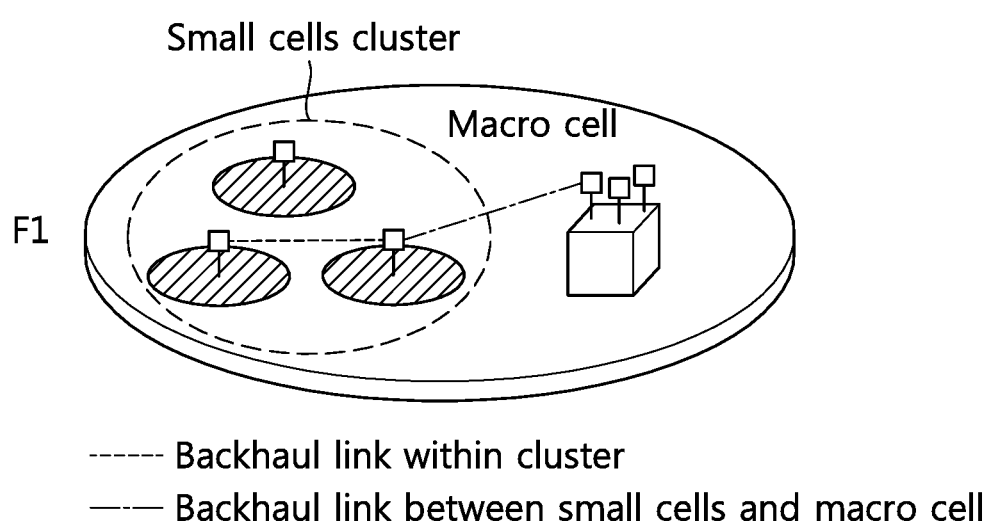
FIG. 10 shows an example of small cell deployment scenario.

FIG. 10 shows an example of small cell deployment scenario. Referring to FIG. 10, small cells are deployed in the presence of an overlaid macro network. The macro cell and the small cells are deployed using the same frequency, i.e., F1. Further, the macro cell and the small cells are deployed in outdoor. Users may be distributed both for outdoor and indoor. Further, a small cell cluster may be considered. The small cell cluster may be denser than scenarios considered for LTE rel-10 enhanced inter-cell interference coordination (eICIC), 3GPP rel-11 further enhanced ICIC (feICIC)/coordinated multi-point (CoMP) transmission/reception. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 11:
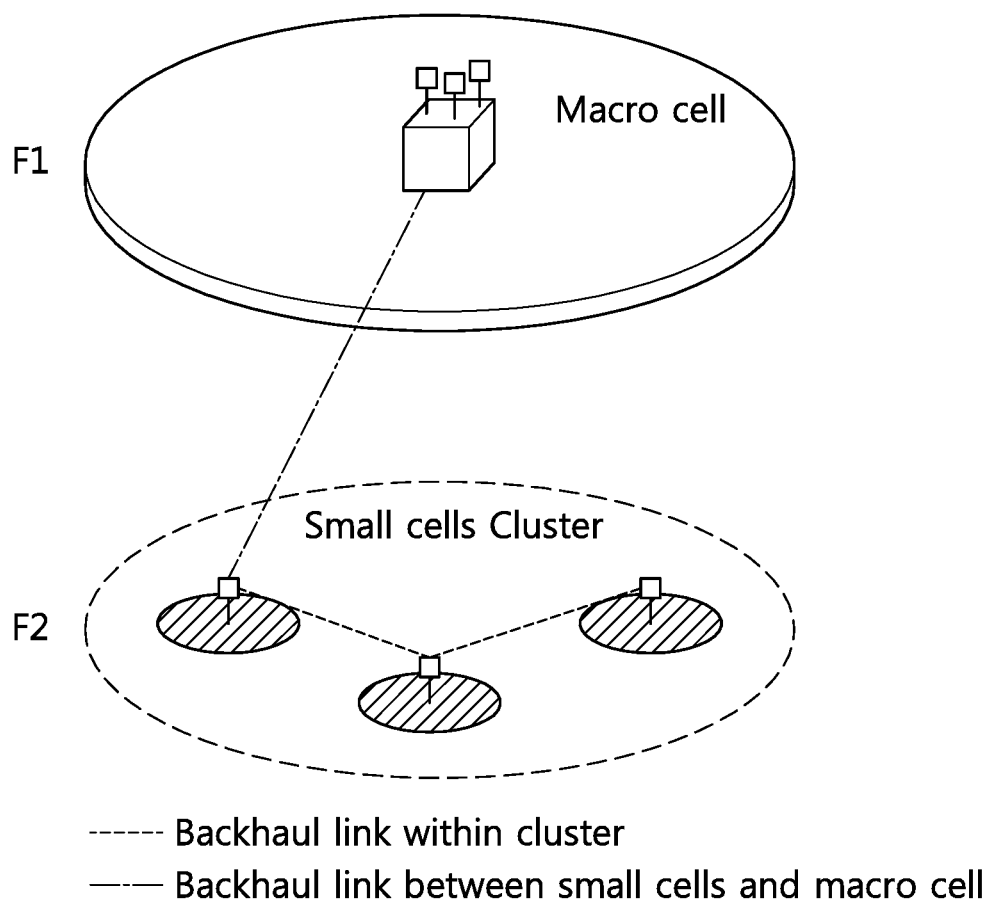
FIG. 11 shows another example of small cell deployment scenario.

FIG. 11 shows another example of small cell deployment scenario. Referring to FIG. 11, small cells are deployed in the presence of an overlaid macro network. The macro cell and the small cells are deployed using different frequencies. That is, the macro cell uses frequency F1, and the small cells use frequency F2. Further, the macro cell and the small cells are deployed in outdoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 12:
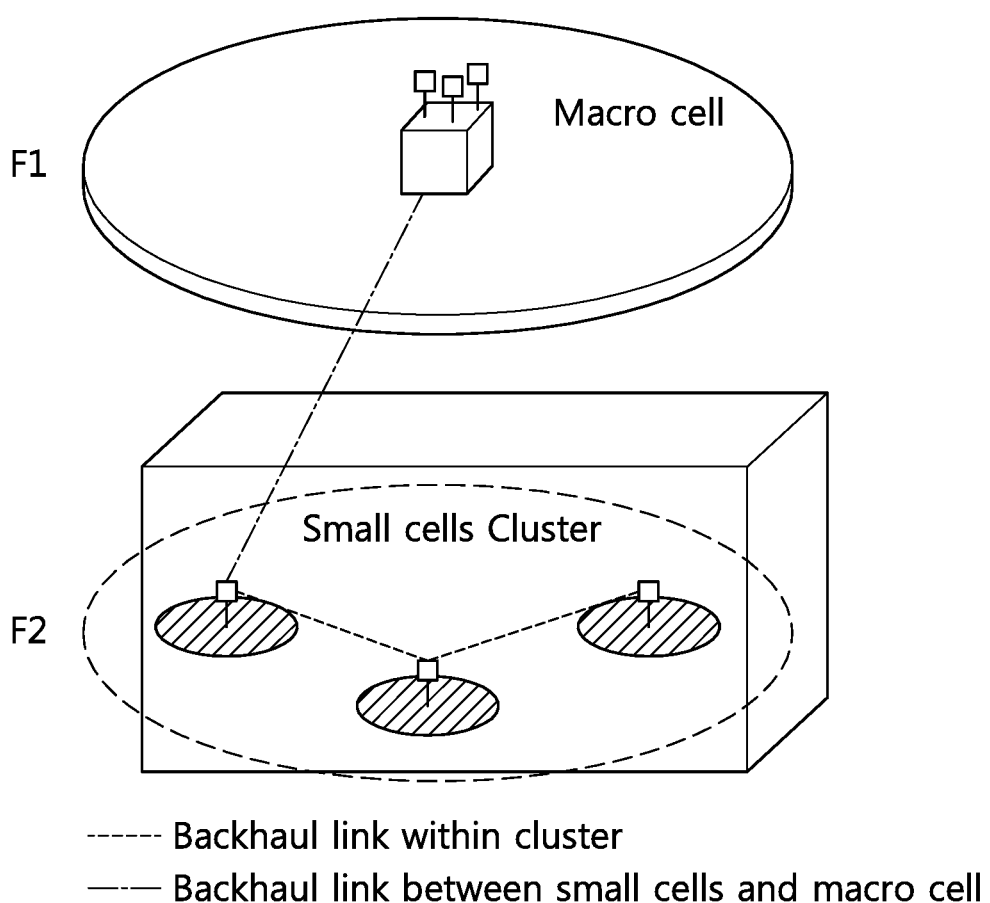
FIG. 12 shows another example of small cell deployment scenario.

FIG. 12 shows another example of small cell deployment scenario. Referring to FIG. 12, small cells are deployed in the presence of an overlaid macro network. The macro cell and the small cells are deployed using different frequencies. That is, the macro cell uses frequency F1, and the small cells use frequency F2. Further, the macro cell is deployed in outdoor, and the small cells are deployed in indoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception.

Alternatively, a sparse scenario may be considered such as the indoor hotspot scenario evaluated for LTE rel-10 scenarios. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 13:
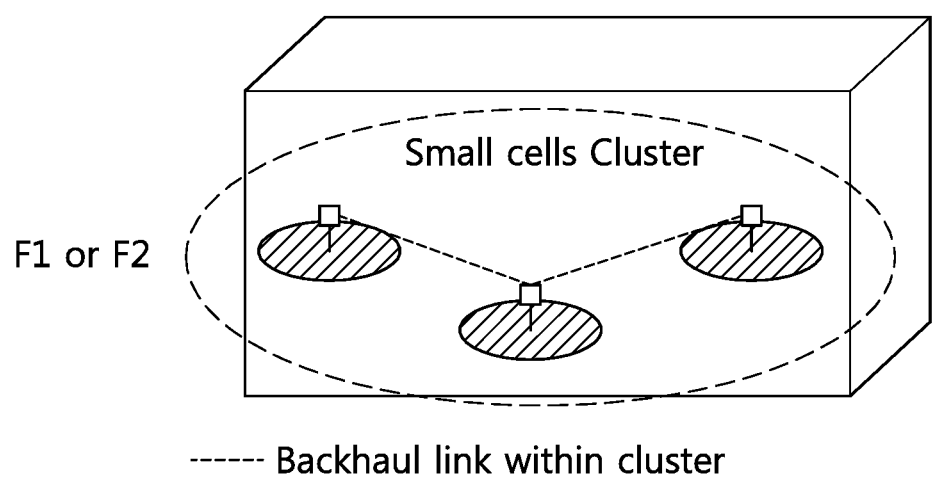
FIG. 13 shows another example of small cell deployment scenario.

FIG. 13 shows another example of small cell deployment scenario. Referring to FIG. 13, macro cell coverage is not present. Small cells are deployed using frequency F1 or F2. Further, the small cells are deployed in indoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception. Alternatively, a sparse scenario may be considered such as the indoor hotspot scenario evaluated for LTE rel-10 scenarios. Further, both ideal backhaul and non-ideal backhaul may be considered for an interface between the small cells within the same small cell cluster. Further, non-ideal backhaul may be assumed for all other interfaces.

Within scenarios described in FIG. 12 and FIG. 13, all features may at least be evaluated in the dense cases. This may not preclude evaluation being carried out equally in other cases for particular features. It may be recommended that spectral efficiency enhancements should be evaluated in sparse cases as well.

Dual connectivity is described.

Figure 14:
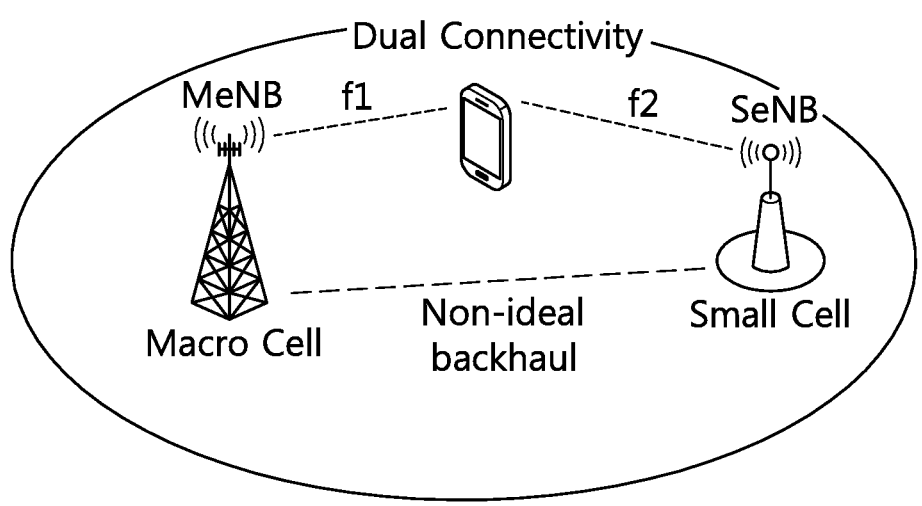
FIG. 14 shows an example of dual connectivity to a macro cell and a small cell.

FIG. 14 shows an example of dual connectivity to a macro cell and a small cell. Referring to FIG. 14, the UE is connected to both the macro cell and the small cell. A macro cell eNB serving the macro cell is the MeNB in dual connectivity, and a small cell eNB serving the small cell is the SeNB in dual connectivity. The MeNB is an eNB which terminates at least S1-MME and therefore act as mobility anchor towards the CN in dual connectivity. If a macro eNB exists, the macro eNB may function as the MeNB, generally. The SeNB is an eNB providing additional radio resources for the UE, which is not the MeNB, in dual connectivity. The SeNB is responsible for transmitting best effort (BE) type traffic, while the MeNB is responsible for transmitting other types of traffic such as VoIP, streaming data, or signaling data. The interface between the MeNB and SeNB is called Xn interface. The Xn interface is assumed to be non-ideal, i.e., the delay in Xn interface could be up to 60 ms.

Figure 15:
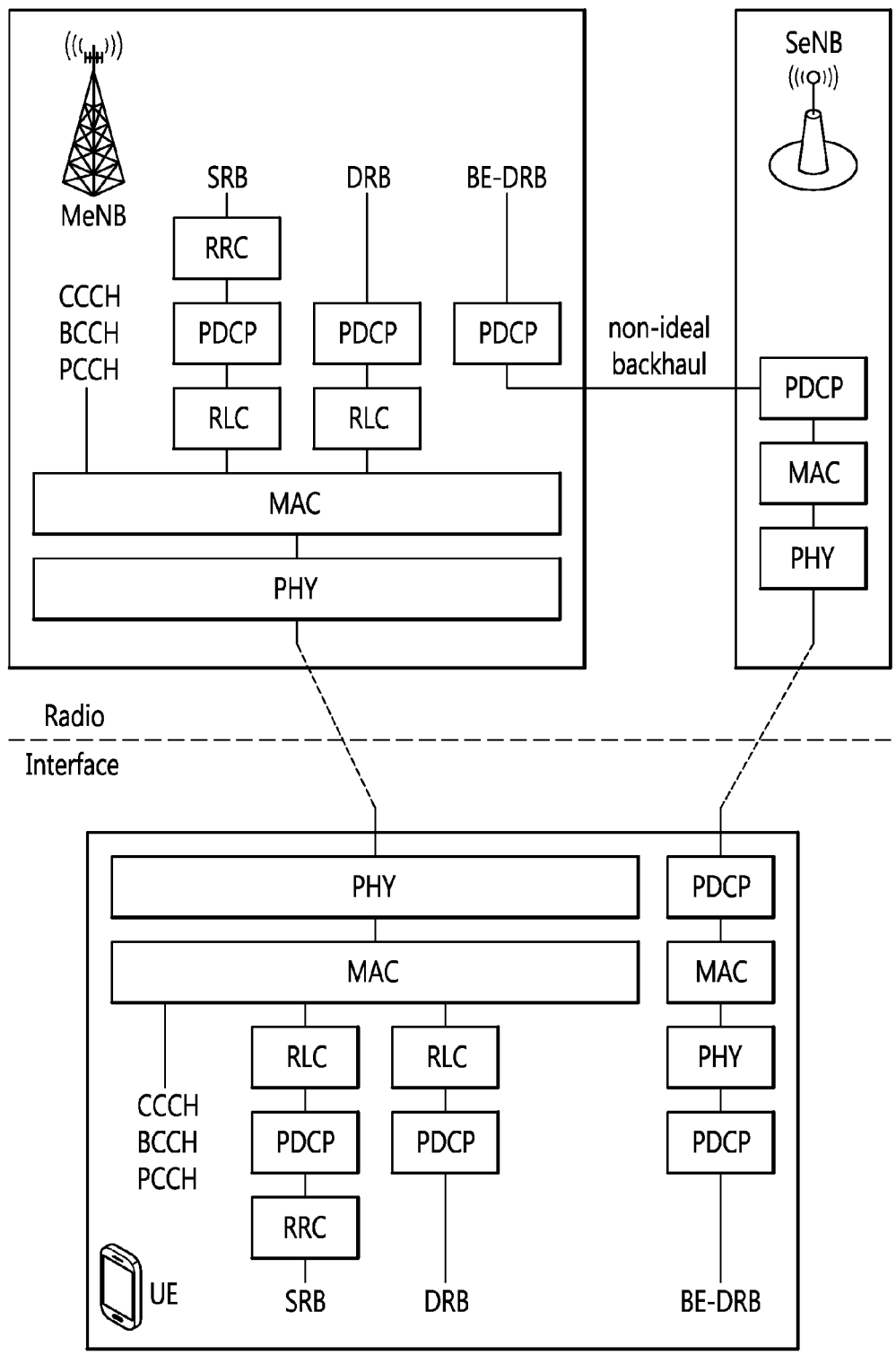
FIG. 15 shows an example of a protocol architecture supporting dual connectivity.

FIG. 15 shows an example of a protocol architecture supporting dual connectivity. To support dual connectivity, various protocol architectures have been studied. Referring to FIG. 15, PDCP and RLC entities are located in different network nodes, i.e., PDCP entities in the MeNB and RLC entities in the SeNB. In the UE side, the protocol architecture is same as the prior art except that the MAC entity is setup for each eNB (i.e., M-MAC for the MeNB and S-MAC SeNB). This is because the scheduling nodes are located in different nodes and two nodes are linked with non-ideal backhaul.

Logical channel prioritization (LCP) is described. It may be referred to Section 5.4.3.1 of 3GPP TS 36.321 V11.3.0 (2013-06).

The LCP is a method for determining what amounts of data of which RB is allocated to a transport block (i.e., MAC PDU), when data of a plurality of RBs are transmitted by being multiplexed into the transport block. That is, the LCP determines how much amounts of given radio resources are allocated to each RB. For this, the UE of the 3GPP LTE may determine amounts of transmission data of each RB for given radio resources in every transmission time by using the LCP procedure described below.

The LCP procedure is applied when a new transmission is performed. RRC controls the scheduling of uplink data by signalling for each logical channel: priority where an increasing priority value indicates a lower priority level, prioritisedBitRate which sets the prioritized bit rate (PBR), bucketSizeDuration which sets the bucket size duration (BSD). The priority may have a value between 1 and 8. The priority having a value of 1 indicates the highest priority, and the priority having a value of 8 indicates the lowest priority. The PBR indicates a minimum bit rate guaranteed for corresponding RB. That is, a bit rate indicated by the PBR is always guaranteed, even though radio environment for corresponding RB is very bad.

The UE shall maintain a variable Bj for each logical channel j. Bj shall be initialized to zero when the related logical channel is established, and incremented by the product PBR×TTI duration for each TTI, where PBR is prioritized bit rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following LCP procedure when a new transmission is performed. The UE shall allocate resources to the logical channels in the following steps.

Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s).

Step 2: the UE shall decrement Bj by the total size of MAC service data units (SDUs) served to logical channel j in Step 1.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above.

The UE should not segment an RLC SDU (or partially transmitted SDU or retransmitted RLC PDU) if the whole SDU (or partially transmitted SDU or retransmitted RLC PDU) fits into the remaining resources.

If the UE segments an RLC SDU from the logical channel, it shall maximize the size of the segment to fill the grant as much as possible.

The UE should maximise the transmission of data.

If the UE is given an UL grant size that is equal to or larger than 4 bytes while having data available for transmission, the UE shall not transmit only padding BSR and/or padding (unless the UL grant size is less than 7 bytes and an AMD PDU segment needs to be transmitted).

The UE shall not transmit data for a logical channel corresponding to a radio bearer that is suspended.

For the LCP procedure, the UE shall take into account the following relative priority in decreasing order:

MAC control element for cell radio network temporary identity (C-RNTI) or data from UL-CCCH;

MAC control element for BSR, with exception of BSR included for padding;

MAC control element for PHR or Extended PHR;

data from any logical channel, except data from UL-CCCH;

MAC control element for BSR included for padding.

A priority and/or a PBR of each RB are transmitted from the RRC layer of the network to the RRC layer of the UE through a RB setup message when the RB is initially configured. Upon receiving the RB setup message, the RRC layer of the UE configures a RB and transmits information on the priority and/or the PBR of each RB to the MAC layer of the UE. Upon receiving the information, the MAC layer of the UE determines amounts of transmission data of each RB, for radio resources given from the network, for each TTI according to the LCP procedure described above.

Figure 16:
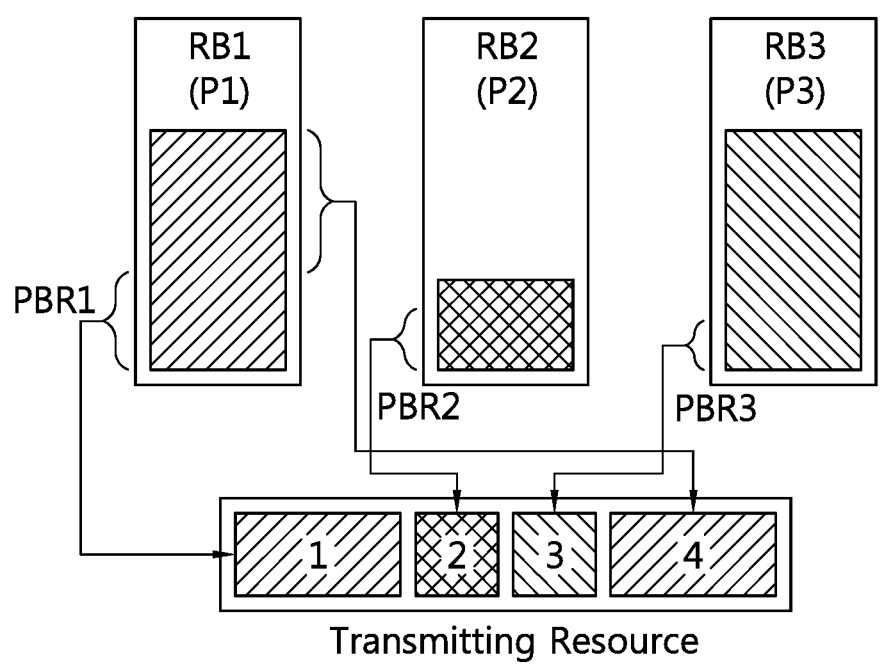
FIG. 16 shows an example of a LCP.

FIG. 16 shows an example of a LCP.

Referring to FIG. 16, there are three RBs, i.e., an RB1 corresponding to a logical channel having the highest priority P1, an RB2 corresponding to a logical channel having a second priority P2, and an RB3 corresponding to a logical channel having the lowest priority P3. In addition, a PBR of the RB1 is a PBR 1, a PBR of the RB2 is a PBR 2, and a PBR or a RB3 is a PBR 3. First, amounts of transmission data are determined according to a PRB of each RB in a descending order of priority of logical channels corresponding to the RB1, the RB2, and the RB3, respectively. That is, the amounts of transmission data can be determined to the PBR 1 of the RB1, the PBR 2 of the RB2, and the PBR 3 of the RB3. Since there are remaining radio resources even after amounts of transmission data corresponding to the PBR of each RB is fully allocated, the remaining radio resources can be allocated to the RB1 having the highest priority.

Table 1 shows an information element (IE) LogicalChannelConfig which is used to configure the logical channel parameters.

TABLE 1

```
-- ASN1START
LogicalChannelConfig ::= SEQUENCE {
    ul-SpecificParameters   SEQUENCE {
        priority               INTEGER (1..16),
        prioritisedBitRate     ENUMERATED {
                                  kBps0, kBps8, kBps16, kBps32, kBps64, kBps128,
                                  kBps256, infinity, kBps512-v1020, kBps1024-v1020,
                                  kBps2048-v1020, spare5, spare4, spare3, spare2,
                                  spare1},
        bucketSizeDuration     ENUMERATED {
                                  ms50, ms100, ms150, ms300, ms500, ms1000, spare2,
                                  spare1},
        logicalChannelGroup    INTEGER (0..3)          OPTIONAL -- Need OR
}                                                      OPTIONAL, -- Cond UL
```

TABLE 1-continued

```
...,
    [[ logicalChannelSR-Mask-r9      ENUMERATED {setup} OPTIONAL -- Cond SRmask
    ]]
}
-- ASN1STOP
```

Referring to Table 1, the bucketSizeDuration field indicates bucket size duration for logical channel prioritization, which is described above. The bucket size duration is represented by a value in milliseconds (ms). Value ms50 corresponds to 50 ms, ms100 corresponds to 100 ms, and so on. The prioritisedBitRate field indicates prioritized bit rate for logical channel prioritization, which is described above. The prioritized bit rate is represented by a value in kilobytes/second (kB/s). Value kBps0 corresponds to 0 kB/s, kBps8 corresponds to 8 kB/s, kBps16 corresponds to 16 kB/s, and so on. Infinity is the only applicable value for SRB1 and SRB2. The priority field indicates logical channel priority for logical channel prioritization, which is described above. Value is an integer.

As described above in FIG. 15, when scheduling nodes of each MAC are located in different network nodes (i.e., MeNB and SeNB), the two MAC entities in the UE, i.e. M-MAC and S-MAC, are operating independently. Therefore, all of the MAC functions including the LCP procedure are also independent between the M-MAC and S-MAC.

However, if there are two MAC entities (M-MAC and S-MAC) and the two MAC entities are connected to the same RLC entity by the same logical channel, a problem in the LCP procedure may occur because the PBR may be enforced twice by independent MAC functions in the M-MAC and S-MAC. For example, it is assumed that DRB1 is configured to the M-MAC and S-MAC in the UE. The PBR "X" is configured to the DRB1. At a certain time, if uplink grants are assigned to both the M-MAC and S-MAC, independent LCP procedure is performed in both the M-MAC and S-MAC. Accordingly, the PBR "X" for the DRB1 may be enforced twice to both the uplink grant from the M-MAC and the uplink grant from the S-MAC. Consequently, when a plurality of MAC entities are connected to one RLC entity, a PBR for a radio bearer, corresponding to the RLC entity, may be enforced beyond a configured value.

In order to solve the problem above, a method for enforcing a PBR for a RB (or logical channel) according to an embodiment of the present invention is described below. Hereinafter, the radio bearer may include at least one of followings:

A radio bearer connected with one RLC entity and more than one MAC entities (e.g., a radio bearer connected with the M-MAC as well as the S-MAC)

Figure 17:
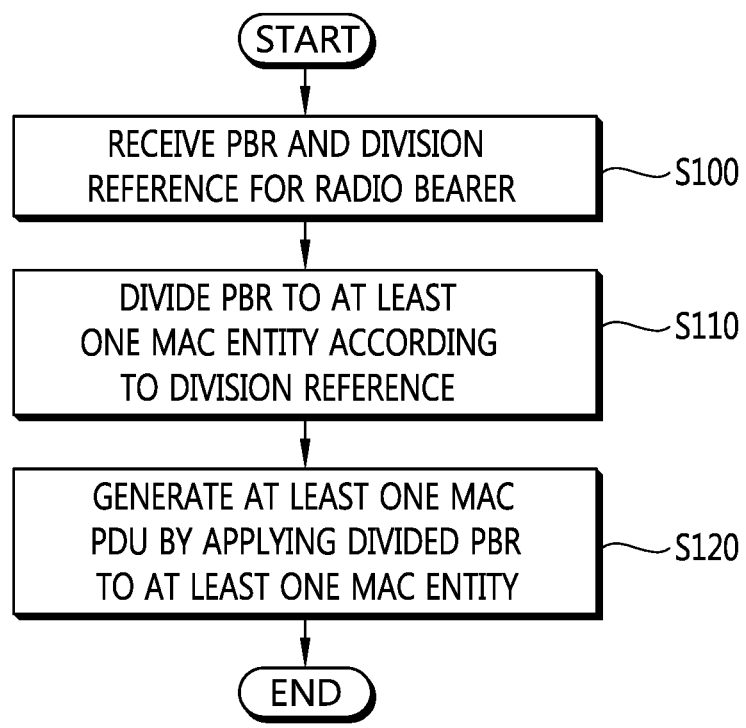
FIG. 17 shows an example of a method for enforcing a PBR according to an embodiment of the present invention.

All data radio bearers,
All signaling radio bearers
All radio bearers
A radio bearer indicated by the eNB FIG. 17 shows an example of a method for enforcing a PBR according to an embodiment of the present invention. In step S100, the UE receives a PBR and a division reference, for a radio bearer in which uplink (UL) data is transmitted through a plurality of media access control (MAC) entities. In step S110, the UE divides the PBR to at least one MAC entity among the plurality of MAC entities according to the division reference. In step S120, the UE generates at least one MAC protocol data unit (PDU) by applying the divided PBR to the at least one MAC entity.

The plurality of MAC entities may include a MAC entity for the MeNB in dual connectivity and a MAC entity for the SeNB in dual connectivity.

The division reference may include a MAC entity identifier indicating the at least one MAC entity, to which the divided PBR is applied, among the plurality of MAC entities. In this case, the PBR is enforced only to the indicated MAC entity.

Alternatively, the division reference may include a ratio of PBRs applied to each of the plurality of MAC entities. In this case, the PBR is divided by the configured ratio and the divided PBR is allocated to the corresponding MAC entity. The ratio of PBRs applied to each of the plurality of MAC entities may include 0:100.

Alternatively, the ratio of PBRs applied to each of the plurality of MAC entities may be implicitly determined based on UL grants. The division reference may correspond to a number of UL grants. In this case, the PBR of each RB is divided by the number of UL grants and the divided PBR is allocated to corresponding MAC entity. Or, the division reference may correspond to an amount of a UL grant. In this case, the PBR of each RB is divided by amount of UL grant and the divided PBR is allocated to the corresponding MAC entity.

Various methods for PBR enforcement described above are described below with embodiments.

Figure 18:
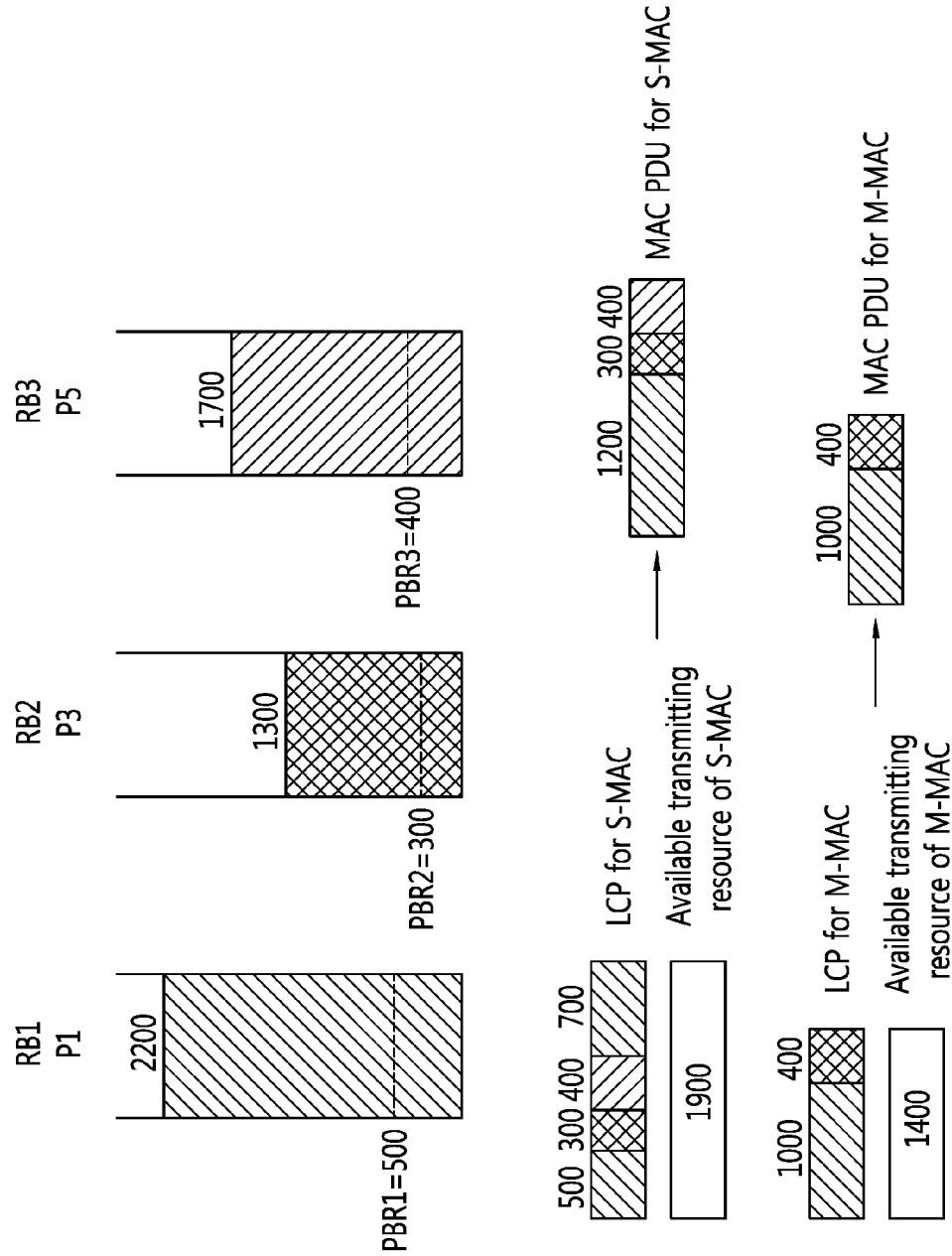
FIG. 18 shows an example of PBR enforcement according to an embodiment of the present invention.

FIG. 18 shows an example of PBR enforcement according to an embodiment of the present invention. In the example of FIG. 18, the PBR is enforced only to the MAC entity(es) indicated by the eNB. The eNB may transmit PBR enforcement configuration to the UE. The PBR enforcement configuration for a radio bearer may include at least one of a PBR, a MAC entity identifier (e.g., M-MAC or S-MAC), a cell identifier, or a group identifier (the group includes at least one cell). The PBR of each RB is allocated only to the MAC entity indicated by the MAC entity identifier in the PBR enforcement configuration. If the cell identifier or the group identifier is included in the PBR enforcement configuration, the PBR is allocated only to the cell or the group.

Referring to FIG. 18, it is assumed that three RBs, i.e., RB1, RB2, and RB3, are multiplexed, and priorities of logical channels corresponding to RB1, RB2, and RB3 are P1, P3, and P5, respectively (P1>P3>P5). RB1, RB2, and RB3 are configured with PBR1=500, PBR2=300, and PBR3=400, respectively. It is also assumed that the UE has two MAC entities, i.e., M-MAC and S-MAC and the UE has UL grants both for the M-MAC and S-MAC. Available transmitting resource for the S-MAC is 1900, and available transmitting resource for the M-MAC is 1400. The UE is configured such that the PBRs for RB1, RB2, and RB3 are enforced only to the S-MAC. Therefore, the PBR1=500, PBR2=300, and PBR3=400 are allocated only to the transmitting resources for the S-MAC. The remaining transmitting resources for the S-MAC (700) and the entire transmitting resources for the M-MAC (1400) are allocated based on the absolute priority rule.

Figure 19:
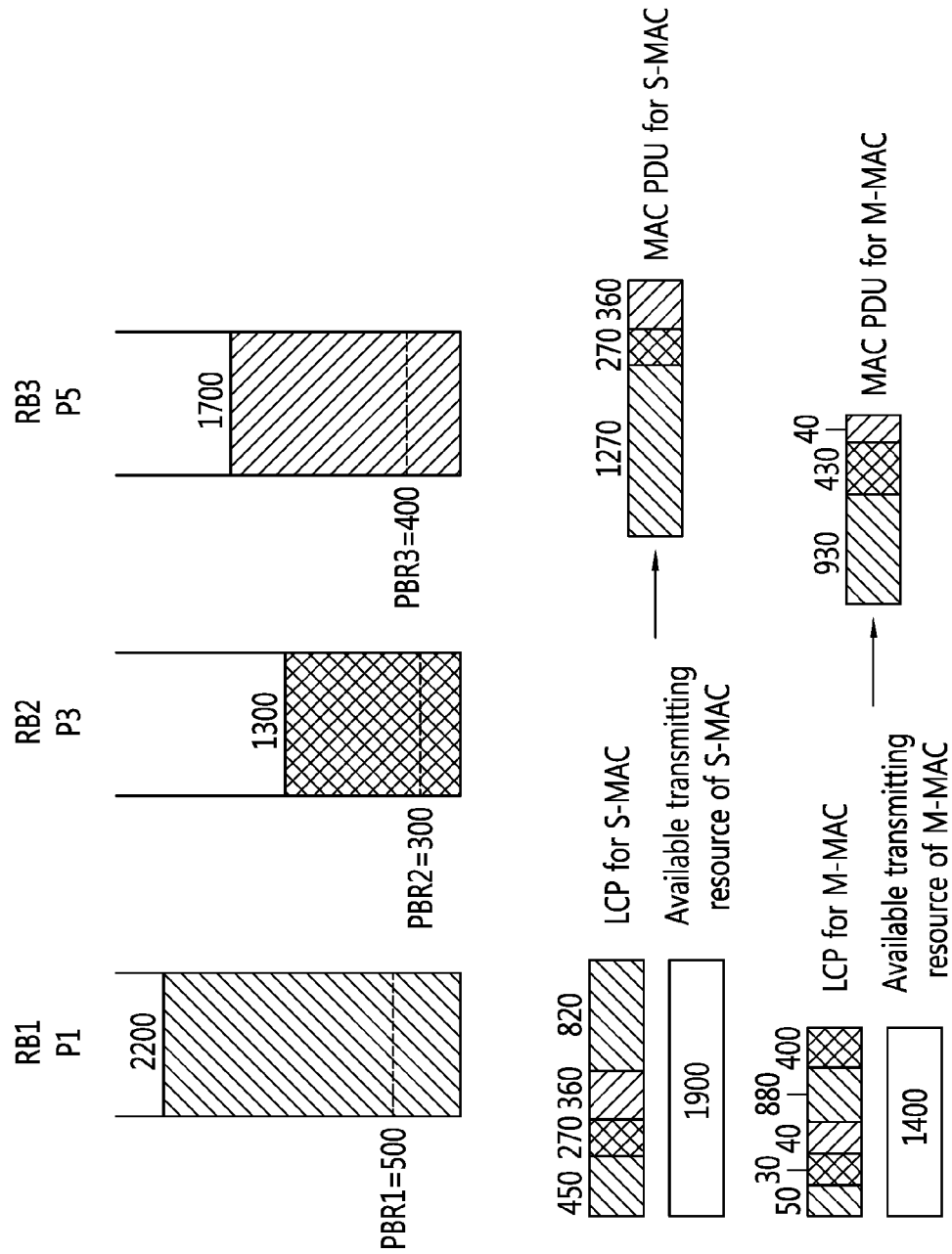
FIG. 19 shows another example of PBR enforcement according to an embodiment of the present invention.

FIG. 19 shows another example of PBR enforcement according to an embodiment of the present invention. In the example of FIG. 19, the PBR of each RB is divided by the radio configured by the eNB. The eNB may transmit PBR enforcement configuration to the UE. The PBR enforcement configuration for a radio bearer may include at least one of a PBR, a MAC entity identifier (e.g., M-MAC or S-MAC), a ratio of each MAC entity (e.g., 0.1 for M-MAC and 0.9 for S-MAC), a cell identifier, or a group identifier (the group includes at least one cell). The PBR is divided by the configured ratio in the PBR enforcement configuration and the divided PBR is allocated to the corresponding MAC entity. If the cell identifier or the group identifier is included in the PBR enforcement configuration, the PBR is allocated to the cell or the group according to the configured ratio.

Referring to FIG. 19, it is assumed that three RBs, i.e., RB1, RB2, and RB3, are multiplexed, and priorities of logical channels corresponding to RB1, RB2, and RB3 are P1, P3, and P5, respectively (P1>P3>P5). RB1, RB2, and RB3 are configured with PBR1=500, PBR2=300, and PBR3=400, respectively. It is also assumed that the UE has two MAC entities, i.e., M-MAC and S-MAC and the UE has UL grants both for the M-MAC and S-MAC. Available transmitting resource for the S-MAC is 1900, and available transmitting resource for the M-MAC is 1400. The UE is configured such that 0.9 (90%) of PBRs are enforced to the S-MAC and 0.1 (10%) of PBRs are enforced to the M-MAC. Therefore, 90% of the PBR1=450, 90% of the PBR2=270, and 90% of the PBR3=360 are allocated to the transmitting resources for the S-MAC, and 10% of the PBR=50, 10% of the PBR2=30, and 10% of the PBR3=40 are allocated to the transmitting resources for the M-MAC. The remaining transmitting resources for the S-MAC (820) and the remaining transmitting resources for the M-MAC (1280) are allocated based on the absolute priority rule.

Figure 20:
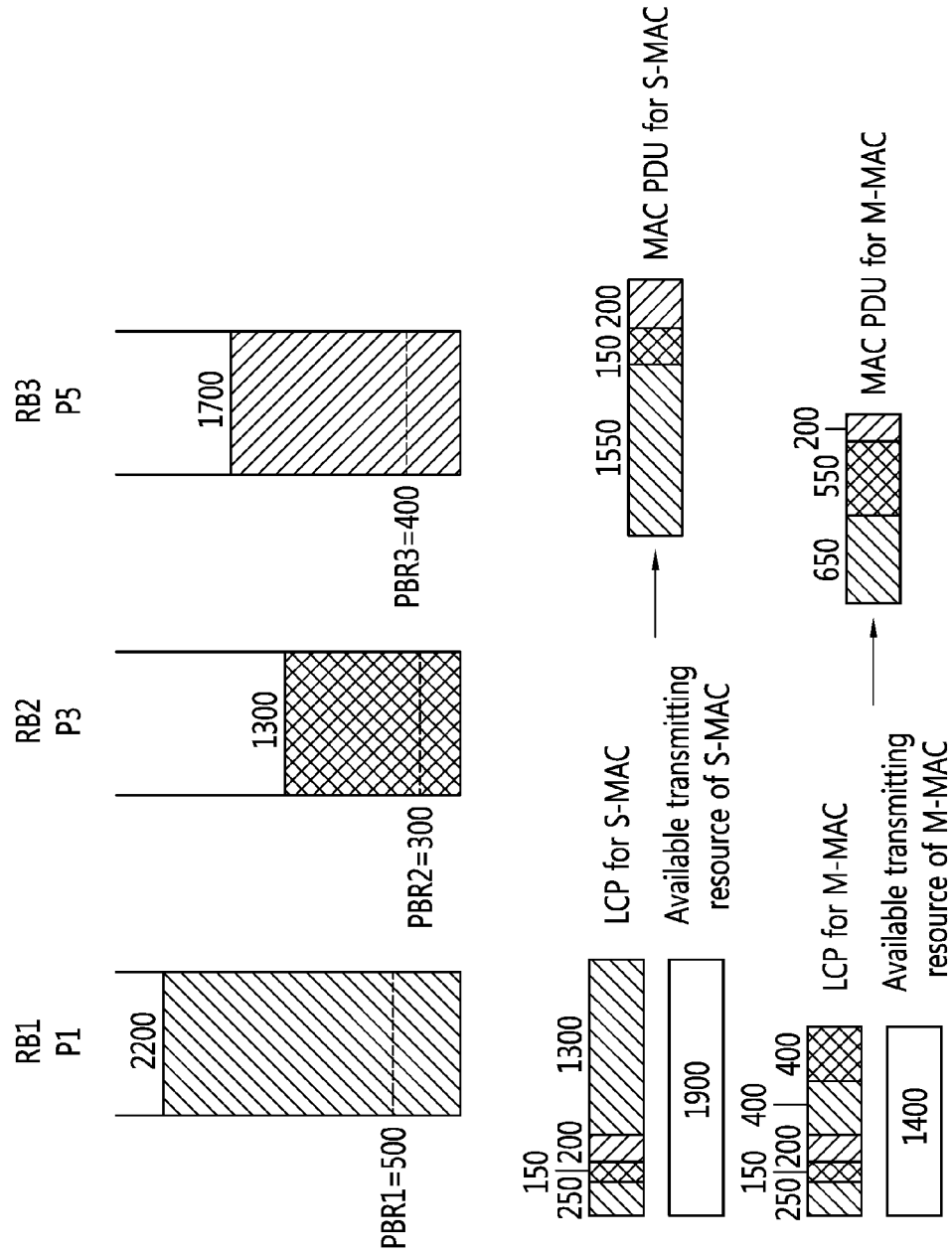
FIG. 20 shows another example of PBR enforcement according to an embodiment of the present invention.

FIG. 20 shows another example of PBR enforcement according to an embodiment of the present invention. In the example of FIG. 20, the PBR of each RB is divided by the number of UL grants and the divided PBR is allocated to corresponding MAC entity. For example, if there are two UL grants available, the PBR of each RB is divided by 2. And divided PBR is enforced to each UL grant. If there are three UL grants available and the two UL grants are for the S-MAC and the remaining one UL grant is for the M-MAC, the PBR of each RB is firstly divided by 3. Then 2×the divided PBR are allocated to the S-MAC and the divided PBR is allocated to the M-MAC.

Referring to FIG. 20, it is assumed that three RBs, i.e., RB1, RB2, and RB3, are multiplexed, and priorities of logical channels corresponding to RB1, RB2, and RB3 are P1, P3, and P5, respectively (P1>P3>P5). RB1, RB2, and RB3 are configured with PBR1=500, PBR2=300, and PBR3=400, respectively. It is also assumed that the UE has two MAC entities, i.e., M-MAC and S-MAC and the UE has UL grants both for the M-MAC and S-MAC at a certain time. Available transmitting resource for the S-MAC is 1900, and available transmitting resource for the M-MAC is 1400. The UE is configured such that the PBR of each RB is divided by the number of UL grants, which is 2. Therefore, 50% of the PBR1=250, 50% of the PBR2=150, and 50% of the PBR3=200 are allocated to the transmitting resources for the S-MAC, and 50% of the PBR1=250, 50% of the PBR2=150, and 50% of the PBR3=200 are allocated to the transmitting resources for the M-MAC. The remaining transmitting resources for the S-MAC (1300) and the remaining transmitting resources for the M-MAC (800) are allocated based on the absolute priority rule.

Figure 21:
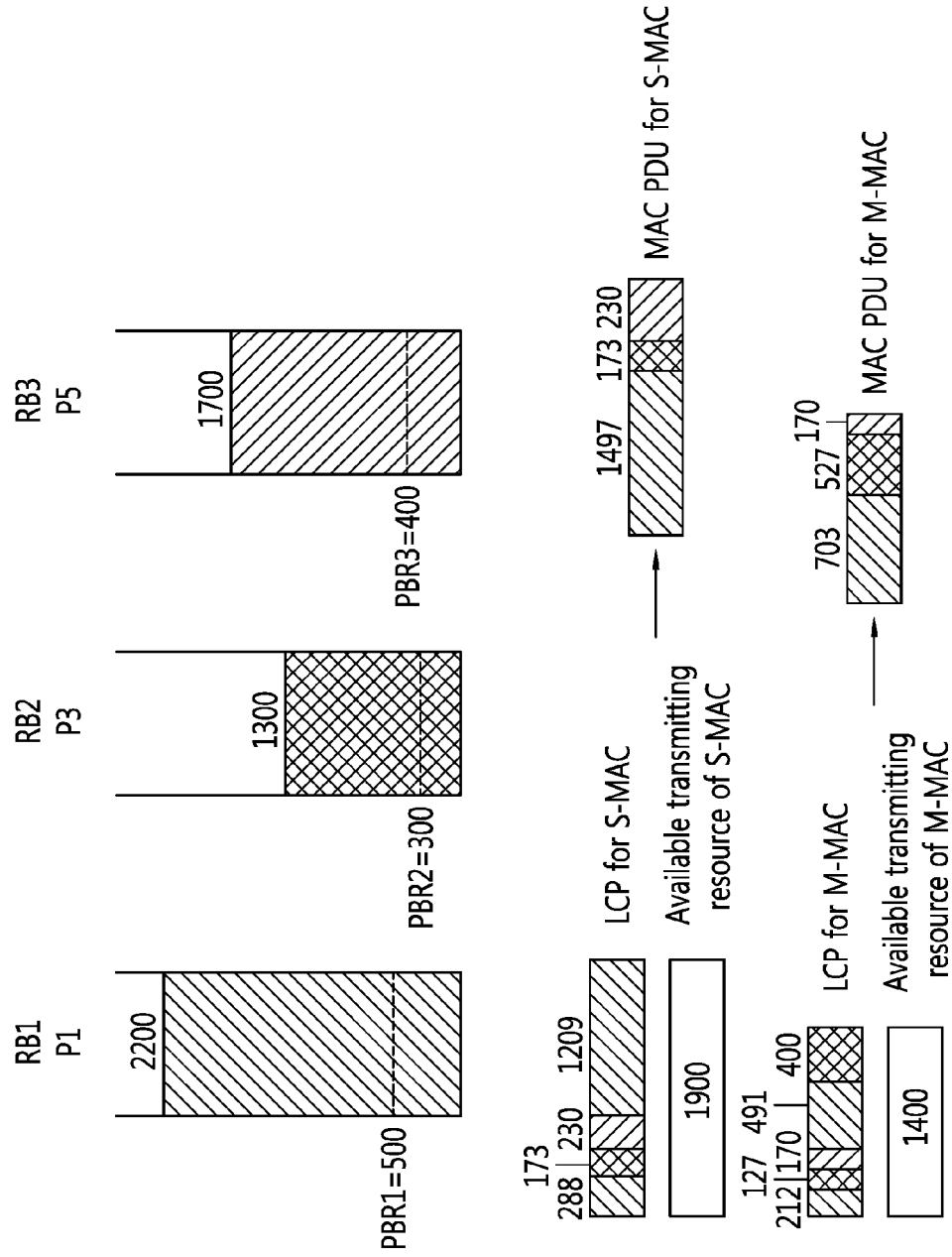
FIG. 21 shows another example of PBR enforcement according to an embodiment of the present invention.

FIG. 21 shows another example of PBR enforcement according to an embodiment of the present invention. In the example of FIG. 21, the PBR of each RB is divided by amount of UL grant and the divided PBR is allocated to the corresponding MAC entity. For example, if there are two UL grants available, and their sizes are 100 and 200 respectively, the PBR is divided to PBR×⅓ and PBR×⅔.

Referring to FIG. 21, it is assumed that three RBs, i.e., RB1, RB2, and RB3, are multiplexed, and priorities of logical channels corresponding to RB1, RB2, and RB3 are P1, P3, and P5, respectively (P1>P3>P5). RB1, RB2, and RB3 are configured with PBR1=500, PBR2=300, and PBR3=400, respectively. It is also assumed that the UE has two MAC entities, i.e., M-MAC and S-MAC and the UE has UL grants both for the M-MAC and S-MAC at a certain time. Available transmitting resource for the S-MAC is 1900, and available transmitting resource for the M-MAC is 1400. Because amount of UL grant for the S-MAC is 1900 and amount of UL grant for the M-MAC is 1400, the PBR of each RB is divided to PBR×1900/(1900+1400) and PBR×1400/(1900+1400). Therefore, 1900/(1900+1400) of PBR1, PBR2, and PBR3 are allocated to the transmitting resources for the S-MAC, and 1400/(1900+1400) of PBR1, PBR2, and PBR3 are allocated to the transmitting resources for the M-MAC. The remaining transmitting resources for the S-MAC and the remaining transmitting resources for the M-MAC are allocated based on the absolute priority rule.

Figure 22:
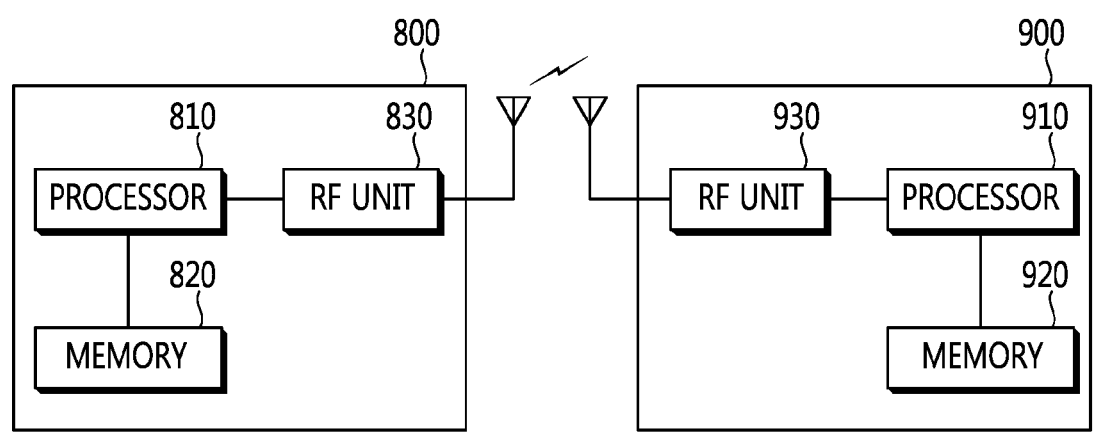
FIG. 22 is a block diagram showing wireless communication system to implement an embodiment of the present invention.

FIG. 22 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for enforcing, by a user equipment (UE) which is connected to both a master eNodeB (MeNB) and a secondary eNodeB (SeNB) in dual connectivity, a prioritized bit rate (PBR) in a wireless communication system, wherein the UE is connected to the MeNB via a first media access control (MAC) entity and connected to the SeNB via a second MAC entity, the method comprising:
   receiving a PBR for each of a plurality of radio bearers (RBs) in which uplink (UL) data is transmitted through the first MAC entity and the second MAC entity;
   receiving a division reference, which includes a ratio of the PBRs applied to the first MAC entity to the PBRs applied to the second MAC entity;
   dividing the PBRs by the ratio in the division reference;
   allocating the divided PBRs to a transmitting resource for the first MAC entity or the second MAC entity, respectively;
   allocating valid RBs to a remaining transmitting resource for the first MAC entity and the second MAC entity based on an absolute priority rule, upon allocating the divided PBRs to the transmitting resource; and
   generating at least one MAC protocol data unit (PDU) by applying the allocated PBRs to at least one MAC entity indicated by the division reference,
   wherein the division reference includes a MAC entity identifier indicating the at least one of the first MAC entity and the second MAC entity, to which the divided PBR is applied.

2. The method of claim 1, wherein the ratio of PBRs applied to each of the plurality of MAC entities includes 0:100.

3. The method of claim 1, wherein the division reference includes at least one of a cell identifier or a group identifier.

4. The method of claim 1, wherein the division reference corresponds to a number of UL grants.

5. The method of claim 1, wherein the division reference corresponds to an amount of a UL grant.

6. The method of claim 1, wherein the MeNB is an eNB in which a signaling radio bearer (SRB) is defined, and wherein the SeNB is an eNB in which the SRB is not defined.

7. A user equipment (UE) which is connected to both a master eNodeB (MeNB) and a secondary eNodeB (SeNB) in dual connectivity, in a wireless communication system, wherein the UE is connected to the MeNB via a first media access control (MAC) entity and connected to the SeNB via a second MAC entity, the UE comprising:
   a radio frequency (RF) unit for transmitting or receiving a radio signal; and
   a processor, coupled to the RF unit, that:
   controls the RF unit to receive a prioritized bit rate (PBR) for each of a plurality of radio bearers (RBs) in which uplink (UL) data is transmitted through the first MAC entity and the second MAC entity;
   controls the RF unit to receive a division reference which includes a ratio of each PBRs applied to the first MAC entity and the second MAC entity;
   divides the PBRs by the ratio in the division reference;
   allocates the divided PBRs to a transmitting resource for the first MAC entity or the second MAC entity, respectively;
   allocates valid RBs to a remaining transmitting resource for the first MAC entity and the second MAC entity based on an absolute priority rule, upon allocating the divided PBRs to the transmitting resource; and
   generates at least one MAC protocol data unit (PDU) by applying the allocated PBRs to at least one MAC entity indicated by the division reference,
   wherein the division reference includes a MAC entity identifier indicating the at least one of the first MAC entity and the second MAC entity, to which the divided PBR is applied.

8. The UE of claim 7, wherein the division reference includes at least one of a cell identifier or a group identifier.

9. The UE of claim 7, wherein the division reference corresponds to a number of UL grants.

10. The UE of claim 7, wherein the division reference corresponds to an amount of a UL grant.

* * * * *